United States Patent
Yoshino et al.

(10) Patent No.: US 9,213,189 B2
(45) Date of Patent: Dec. 15, 2015

(54) STEREOSCOPIC DISPLAY DEVICE

(71) Applicant: Sharp Kabushiki Kaisha, Osaka-shi, Osaka (JP)

(72) Inventors: Takuto Yoshino, Osaka (JP); Takehiro Murao, Osaka (JP); Hiroshi Fukushima, Osaka (JP); Tomoo Takatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/378,396

(22) PCT Filed: Feb. 7, 2013

(86) PCT No.: PCT/JP2013/052919
§ 371 (c)(1),
(2) Date: Aug. 13, 2014

(87) PCT Pub. No.: WO2013/121982
PCT Pub. Date: Aug. 22, 2013

(65) Prior Publication Data
US 2015/0009430 A1  Jan. 8, 2015

(30) Foreign Application Priority Data

Feb. 15, 2012   (JP) ................... 2012-031053

(51) Int. Cl.
*G02B 27/22* (2006.01)
*G06F 3/03* (2006.01)
(Continued)

(52) U.S. Cl.
CPC .............. *G02B 27/2214* (2013.01); *G06F 3/03* (2013.01); *G06F 3/0416* (2013.01); *H04N 13/0409* (2013.01); *G02F 1/13471* (2013.01); *G02F 2201/44* (2013.01)

(58) Field of Classification Search
CPC ............ G02B 27/2214; G02F 1/13471; G02F 2201/44; G06F 3/03; G06F 3/0416; H04N 13/0409
See application file for complete search history.

(56) References Cited

U.S. PATENT DOCUMENTS

2010/0214261 A1   8/2010  Yamanaka et al.
2012/0293452 A1  11/2012  Tun et al.

FOREIGN PATENT DOCUMENTS

| CN | 102221951 A | 10/2011 |
| EP | 1 650 983 A1 | 4/2006 |
| JP | 2003-215552 A | 7/2003 |
| JP | 2010-197570 A | 9/2010 |

(Continued)

OTHER PUBLICATIONS

Official Communication issued in International Patent Application No. PCT/JP2013/052919, mailed on Apr. 9, 2013.

*Primary Examiner* — Dung Nguyen
*Assistant Examiner* — Tai Duong
(74) *Attorney, Agent, or Firm* — Keating & Bennett, LLP (57) ABSTRACT

The objective is to provide a stereoscopic display device that is capable of preventing a malfunction of the touch panel while maintaining 3D capability. The device includes: a display panel (12); a switch liquid crystal panel (14); a touch panel (20); a driving circuit (16); and an RC circuit (18). The switch liquid crystal panel (14) is located on the front side of the display panel (12) and is capable of forming a parallax barrier (38). The touch panel (20) is located on the front side of the switch liquid crystal panel (14). The driving circuit (16) drives the switch liquid crystal panel (14) to form the parallax barrier (38). The RC circuit (18) is located between the switch liquid crystal panel (14) and the driving circuit (16). The driving circuit (16) drives the switch liquid crystal panel (14) using a voltage with an effective value of 3 volts or more.

7 Claims, 9 Drawing Sheets

(51) Int. Cl.
*G02F 1/133* (2006.01)
*G02F 1/1343* (2006.01)
*H04N 13/04* (2006.01)
*G06F 3/041* (2006.01)
*G02F 1/1347* (2006.01)

(56) References Cited

FOREIGN PATENT DOCUMENTS

JP       2012-173483 A    9/2012
WO   WO 2012/036015 A1 *  3/2012

* cited by examiner

FIG. 17

STEREOSCOPIC DISPLAY DEVICE

TECHNICAL FIELD

The present invention relates to a stereoscopic display device including a touch panel and a switch liquid crystal panel.

BACKGROUND ART

Display devices including touch panels are known. With such a display device, it is necessary to prevent a malfunction of the touch panel.

JP 2010-197570 A discloses a liquid crystal display device that is capable of reducing noise which would cause a malfunction of the touch panel. The liquid crystal display device described in this publication includes a pre-charge circuit. The pre-charge circuit pre-charges all the signal lines during a horizontal blanking period before an analog pixel voltage is supplied to the signal lines. Thus, the voltages on the signal lines do not change rapidly. As a result, less noise is generated from the liquid crystal panel.

Recent display devices include stereoscopic display devices capable of allowing the viewer to see stereoscopic images. For such a stereoscopic display device, including a switch liquid crystal panel is proposed to switch between 2D display and 3D display.

A stereoscopic display device including a switch liquid crystal panel may include a touch panel. In this case, it is necessary to prevent a malfunction of the touch panel while maintaining 3D capability.

DISCLOSURE OF THE INVENTION

An object of the present invention is to provide a stereoscopic display device that is capable of preventing a malfunction of the touch panel while maintaining 3D capability.

A stereoscopic display device according to an embodiment of the present invention includes: a display panel; a switch liquid crystal panel; a touch panel; a driving circuit; and an RC circuit. The display panel displays a composite image having stripe-shaped right eye sub-images and left eye sub-images arranged alternately. The switch liquid crystal panel is located on a front side of the display panel and is capable of forming a parallax barrier having transparent portions for transmitting light and light-shielding portions for blocking light arranged alternately. The touch panel is located on a front side of the switch liquid crystal panel. The driving circuit drives the switch liquid crystal panel to form the parallax barrier. The RC circuit is located between the switch liquid crystal panel and the driving circuit. The driving circuit drives the switch liquid crystal panel using a voltage with an effective value of 3 volts or more.

The stereoscopic display device according to an embodiment of the present invention is capable of preventing a malfunction of the touch panel while maintaining 3D capability.

EMBODIMENTS FOR CARRYING OUT THE INVENTION

A stereoscopic display device according to an embodiment of the present invention includes: a display panel; a switch liquid crystal panel; a touch panel; a driving circuit; and an RC circuit. The display panel displays a composite image having stripe-shaped right eye sub-images and left eye sub-images arranged alternately. The switch liquid crystal panel is located on a front side of the display panel and is capable of forming a parallax barrier having transparent portions for transmitting light and light-shielding portions for blocking light arranged alternately. The touch panel is located on a front side of the switch liquid crystal panel. The driving circuit drives the switch liquid crystal panel to form the parallax barrier. The RC circuit is located between the switch liquid crystal panel and the driving circuit. The driving circuit drives the switch liquid crystal panel using a voltage with an effective value of 3 volts or more (first arrangement).

In the first arrangement, the driving circuit may drive the switch liquid crystal panel to form a parallax barrier. The parallax barrier separates a composite image being displayed on the display panel into sub-images. Thus, only the right eye sub-images reach the right eye of the viewer, and only the left eye sub-images reach the left eye of the viewer. As a result, the viewer sees a stereoscopic image.

An RC circuit is provided between the switch liquid crystal panel and driving circuit. The circuit is capable of blunting the waveform of a voltage for driving the switch liquid crystal panel. As a result, the touch panel is less susceptible to noise.

Blunting the waveform of a voltage for driving the switch liquid crystal panel reduces the effective value of the voltage. A reduction in the effective value of the voltage impairs the ability of the light-shielding portions to block light. That is, the light-shielding capability of the parallax barrier decreases. As a result, sufficient 3D capability cannot be achieved.

In the first arrangement, the effective value of a voltage for driving the switch liquid crystal panel is 3 volts or more. This will suppress the reduction in the light-shielding capability of a parallax barrier. As a result, the intended 3D capability may be maintained.

In a second arrangement, starting from the first arrangement, the switch liquid crystal panel includes: a pair of substrates; a liquid crystal layer; a common electrode; and first driving electrodes. The liquid crystal layer is enclosed between the substrates. The common electrode is provided on one of the substrates. The first driving electrodes are provided on the other one of the substrates. The light-shielding portions are formed as the driving circuit applies to the first driving electrodes a voltage different from that applied to the common electrode.

In a third arrangement, starting from the second arrangement, first auxiliary electrodes are included. The first auxiliary electrodes are provided on the other one of the substrates, the first driving electrodes and the first auxiliary electrodes being arranged alternately. The common electrode includes second driving electrodes and second auxiliary electrodes. The second driving electrodes are provided on the one of the substrates. The second auxiliary electrodes are provided on the one of the substrates, the second driving electrodes and the second auxiliary electrodes being arranged alternately. The first driving electrodes are perpendicular to the second driving electrodes as viewed looking at the front side of the switch liquid crystal panel. First light-shielding portions are formed as the driving circuit applies to the first driving electrodes a voltage different from that for the second driving electrodes and the second auxiliary electrodes. Second light-shielding portions are formed that are perpendicular to the first light-shielding portions as the driving circuit applies to the second driving electrodes a voltage different from that for the first driving electrodes and the first auxiliary electrodes.

In this case, touch sensor capability may be provided in a stereoscopic display device that supports landscape and portrait modes.

In a fourth arrangement, starting from the second arrangement, the one of the substrates is located on the touch panel. The common electrode overlies the entire liquid crystal layer as viewed looking at the front side of the switch liquid crystal panel. The RC circuit includes a capacitor. The capacitor has one terminal connected with the common electrode and the other terminal that is grounded.

In this case, the common electrode functions as a shield. Thus, the touch panel is less susceptible to noise generated when the switch liquid crystal panel is being driven. Capacitor having one terminal connected with the common electrode encompasses one of the electrodes of the capacitor being the common electrode or being connected with the common electrode via a line connected with it.

In a fifth arrangement, starting from the fourth arrangement, the capacitor includes the common electrode. Thus, one of the electrodes of the capacitor is implemented using the common electrode. This results in a smaller number of components.

In a sixth arrangement, starting from one of the first to fifth arrangements, the RC circuit has a cutoff frequency that is equal to or smaller than a driving frequency for the touch panel. Thus, the touch panel is less susceptible to noise.

In a seventh arrangement, starting from the sixth arrangement, the cutoff frequency is 70% of the driving frequency or smaller. Thus, the touch panel is still less susceptible to noise.

In an eighth arrangement, starting from the second or third arrangement, that one of the substrates which is located adjacent the touch panel serves as a base substrate of the touch panel. Thus, the stereoscopic display device has a smaller thickness.

Now, more specific embodiments of the present invention will be described with reference to the drawings. The same or corresponding components in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

First Embodiment

Figure 1:
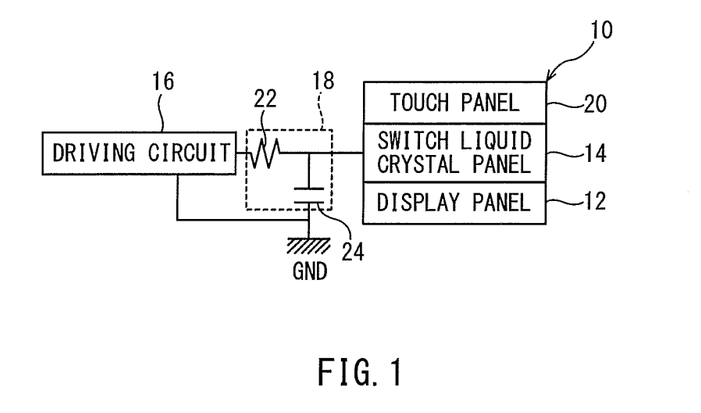
FIG. 1 is a conceptual schematic diagram of an exemplary stereoscopic display device according to a first embodiment of the present invention.

A stereoscopic display device 10 according to a first embodiment of the present invention will be described with reference to FIG. 1. The stereoscopic display device 10 may be used in a mobile phone, portable digital assistance, game machine or digital camera, for example.

Overall Construction

The stereoscopic display device 10 includes a display panel 12, a switch liquid crystal panel 14, a driving circuit 16, an RC circuit 18 and a touch panel 20. The RC circuit 18 includes a resistor 22 and a capacitor 24.

Display Panel

The display panel 12 may be any panel that is capable of displaying sub-images for effecting stereoscopy (right eye and left eye sub-images). The display panel 12 may be, for example, a liquid crystal panel, or may be a plasma display panel, organic electroluminescent (EL) panel or inorganic EL panel.

The display panel 12 includes a plurality of pixels. The pixels may be arranged in a matrix, for example.

The display panel 12 has columns of pixels for displaying sub-images to be seen by the right eye of the viewer (right eye sub-images) and columns of pixels for displaying sub-images to be seen by the left eye of the viewer (left eye sub-images) arranged alternately in a horizontal direction of the display panel 12. That is, each right eye or left eye sub-image is divided into sub-images each corresponding to a pixel column (i.e. into stripes). Then, a composite image including these stripe-shaped right eye and left eye sub-images arranged alternately is displayed on the display panel 12.

Although not shown, the display panel 12 has a driver connected thereto for driving the display panel 12.

Switch Liquid Crystal Panel

The switch liquid crystal panel 14 is located on the front side of the display panel 12. The switch liquid crystal panel 14 is capable of forming a parallax barrier. A parallax barrier includes transparent portions for transmitting light and light-shielding portions for blocking light arranged alternately. A parallax barrier divides a composite image displayed on the display panel 12 into sub-images. As such, only right eye sub-images reach the right eye of the viewer and only left eye sub-images reach the left eye of the viewer.

The switch liquid crystal panel 14 will be described with reference to FIG. 2. The switch liquid crystal panel 14 includes a pair of substrates 26 and 28, and a liquid crystal layer 30 enclosed between the substrates 26 and 28.

The substrates 26 and 28 may be any translucent substrates. The substrates 26 and 28 may be, for example, alkali-free glass substrates.

The liquid crystal layer 30 is enclosed between the substrates 26 and 28 as it is sealed in by seal members 32. The operating mode of the liquid crystal may be, for example, the TN mode.

A common electrode 34 is provided on the substrate 26. The common electrode 34 may be any transparent conductive film. The common electrode 34 may be, for example, an indium tin oxide film. The common electrode 34 overlies the entire liquid crystal layer 30 as viewed looking at the front side of the switch liquid crystal panel 14. That is, the common electrode 34 covers an area that overlies the entire area covered by a parallax barrier.

A plurality of driving electrodes (first driving electrodes) 36 are provided on the substrate 28. Each of the driving electrodes 36 extends in a vertical direction of the switch liquid crystal panel 14 (vertical direction) with a generally constant width. The driving electrodes 36 are arranged in a horizontal direction of the switch liquid crystal panel 14 (horizontal direction) at regular intervals.

Driving Circuit

The driving circuit 16 drives the switch liquid crystal panel 14 to form a parallax barrier. The parallax barrier 38 formed in the switch liquid crystal panel 14 will be described with reference to FIG. 3.

Figure 3:
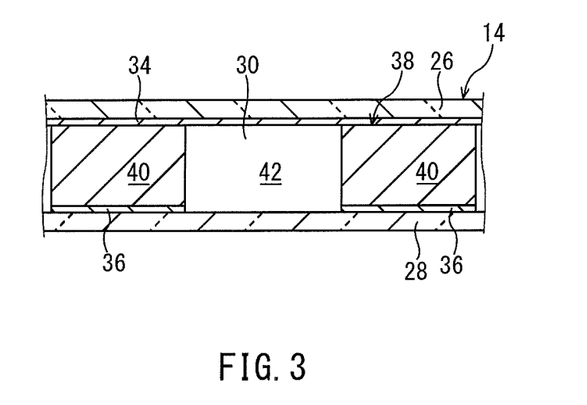
FIG. 3 is a cross-sectional view of a parallax barrier formed in the switch liquid crystal panel.

To form a parallax barrier 38, the driving circuit 16 applies to the driving electrodes 36 a voltage different from that applied to the common electrode 34. This changes the orientation of liquid crystal molecules located between the driving electrodes 36 and common electrode 34. Thus, as viewed looking at the front side of the switch liquid crystal panel 14, the portions of the panel that cover the driving electrodes 36 serve as light-shielding portions, while the portions between the light-shielding portions 40 serve as transparent portions 42. As a result, a parallax barrier 38 having light-shielding portions 40 and transparent portions 42 arranged alternately is formed in the switch liquid crystal panel 14. As a parallax barrier 38 is formed, a composite image displayed on the display panel 12 is divided into sub-images. As a result, only right eye sub-images reach the right eye of the viewer and only left eye sub-images reach the left eye of the viewer.

To form a parallax barrier 38, voltages may be applied to the electrodes 34 and 36 where the voltage applied to the driving electrodes 36 and the voltage applied to the common electrode 34 are in opposite phases, for example, or where a voltage is applied to the driving electrodes 36 while the common electrode 34 is grounded.

Figure 2:
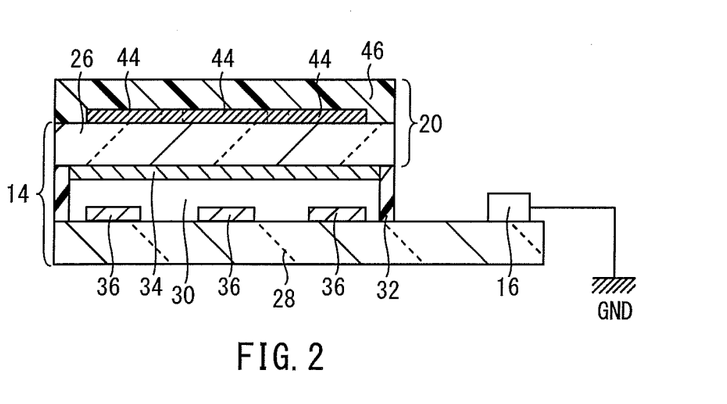
FIG. 2 is a schematic cross-sectional view of an exemplary switch liquid crystal panel.

In the implementation shown in FIG. 2, the driving circuit 16 is provided on the substrate 28; alternatively, the driving circuit 16 may be provided elsewhere than on the substrate 28.

RC Circuit

The RC circuit 18 (see FIG. 1) is located between the switch liquid crystal panel 14 and driving circuit 16. The RC circuit 18 blunts the waveform of a voltage applied to the switch liquid crystal panel 14.

The resistor 22 (see FIG. 1) of the RC circuit 18 is implemented using a line for applying a voltage to the switch liquid crystal panel 14 (i.e. a line for applying a voltage between the common electrode 34 and driving electrodes 36). This line may include, for example, an extended line provided on the substrate 28.

The capacitor 24 (see FIG. 1) of the RC circuit 18 is connected with the line for applying a voltage to the switch liquid crystal panel 14. In implementations where this line includes an extended line provided on the substrate 28, one terminal of the capacitor 24 is connected with the extended line on the substrate. The other terminal of the capacitor 24 is grounded. This other terminal of the capacitor 24 may be grounded in any manner. This other terminal of the capacitor 24 may be, for example, grounded via the grounding wire of the driving circuit 16.

The cutoff frequency of the RC circuit 18 is taken into consideration when setting the capacitance of the capacitor 24. The cutoff frequency is equal to or smaller than the driving frequency of the touch panel 20, and, preferably, 70% of the driving frequency of the touch panel 20 or smaller. Thus, the touch panel 20 is less susceptible to noise even when the driving frequency of the touch panel 20 changes due to a change in temperature, for example.

Touch Panel

The touch panel 20 is located on the front side of the switch liquid crystal panel 14. The touch panel 20 may be any panel that is capable of detecting touch locations. The touch panel 20 may be, for example, an electrostatic capacitance touch panel.

In the implementation shown in FIG. 2, the base substrate of the touch panel 20 is implemented using the substrate 26 of the switch liquid crystal panel 14. That is, in implementations where the touch panel 20 is an electrostatic capacitance touch panel, touch electrodes 44 are provided on the substrate 26, as shown in FIG. 2. The touch electrodes 44 are covered with a protection film 46.

Although not shown, a controller is connected with the touch panel 20 for controlling the touch panel 20.

In the stereoscopic display device 10, a parallax barrier 38 is formed to separate a composite image displayed on the display panel 12 into sub-images. Thus, only right eye sub-images reach the right eye of the viewer and only left eye sub-images reach the left eye of the viewer. As a result, the viewer sees a stereoscopic image without using special glasses.

Figure 4:
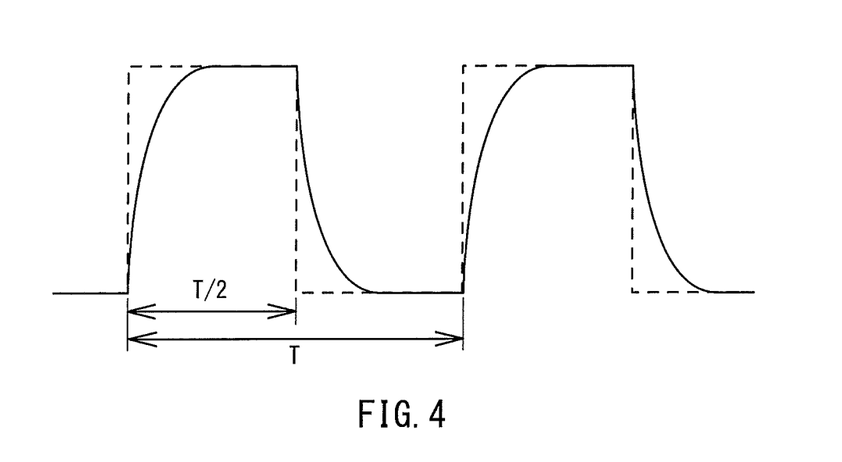
FIG. 4 is a time chart showing a waveform of a voltage applied to the switch liquid crystal panel.

An RC circuit 18 is located between the switch liquid crystal panel 14 and driving circuit 16. Thus, the waveform of a voltage applied to the switch liquid crystal panel 14 may be blunted, as shown in FIG. 4. As such, the touch panel 20 is less susceptible to noise.

Blunting the waveform of a voltage applied reduces the effective value of the voltage. A reduction in the effective value of the voltage impairs the ability of the light-shielding portions 40 to block light. That is, the light-shielding capability of the parallax barrier 38 decreases. As a result, the crosstalk ratio increases and sufficient 3D capability cannot be achieved.

Crosstalk ratio indicates how much the black display level increases relative to the background level (produced when both the left and right eye sub-images are displayed in black) when, for example, the parallax barrier 38 is formed in the switch liquid crystal panel 14 and one of the group of pixels for left eye sub-images and the group of pixels for right eye sub-images displays white and the other one displays black. Crosstalk ratio may serve as an indicator of to what extent, given a right eye sub-image and a left eye sub-image, one is projected in the other.

Crosstalk ratio is defined by the following equations (1) and (2):

$$LXT=\{(BL(\eta)-CL(\eta))/(AL(\eta)-CL(\eta))\}\times 100 \quad (1), \text{ and}$$

$$RXT=\{(AR(\eta))/CR(\eta))/(BR(\eta)-CR(\eta))\}\times 100 \quad (2)$$

Figure 5:
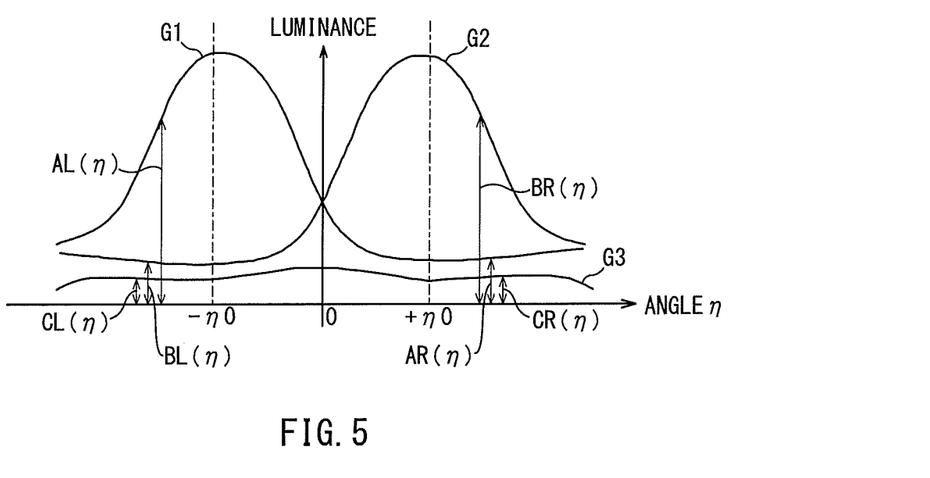
FIG. 5 is a graph illustrating luminance versus angle θ.
Figure 6:
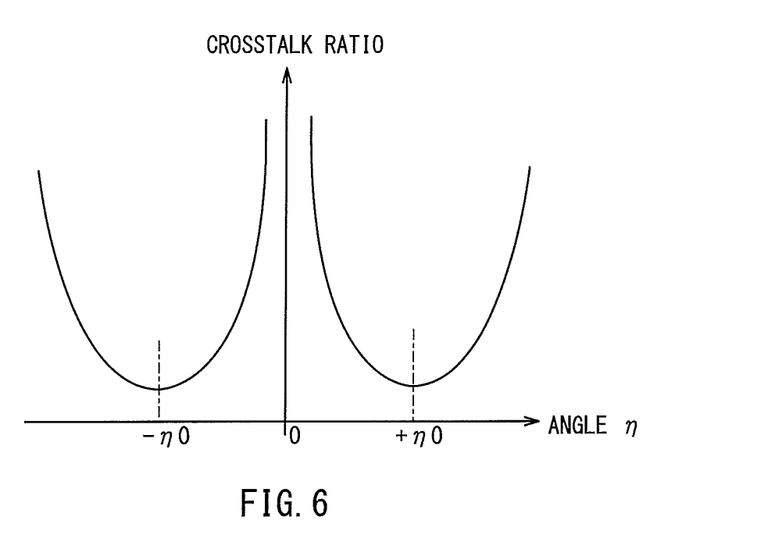
FIG. 6 is a graph illustrating crosstalk ratio versus angle θ.

LXT denotes the crosstalk ratio for the left eye, and RXT denotes the crosstalk ratio for the right eye. $\eta$ denotes the angle $\eta$. As shown in FIG. 5, AL($\eta$) represents the luminance of an image seen by the left eye according to graph G1, AR($\eta$) represents the luminance of an image seen by the right eye according to graph G1, BL($\eta$) represents the luminance of an image seen by the left eye according to graph G2, BR($\eta$) represents the luminance of an image seen by the right eye according to graph G2, CL($\eta$) represents the luminance of an image seen by the left eye according to graph G3, and CR($\eta$) represents the luminance of an image seen by the right eye according to graph G3. The crosstalk ratio obtained from the above equations (1) and (2) is at the minimum for the eye points (angle $\eta=\pm\eta0$), as shown in FIG. 6. In the following description, crosstalk ratio means the crosstalk ratio for the eye points. Generally, the lower the crosstalk ratio, the better 3D display can be achieved and the less the human body will be affected.

The effective value of a voltage applied to the switch liquid crystal panel 14 is 3 volts or more. This will suppress the reduction in the light-shielding capability of the parallax barrier 38. That is, the crosstalk ratio will be reduced. As a result, the intended 3D capability may be maintained.

Figure 7:
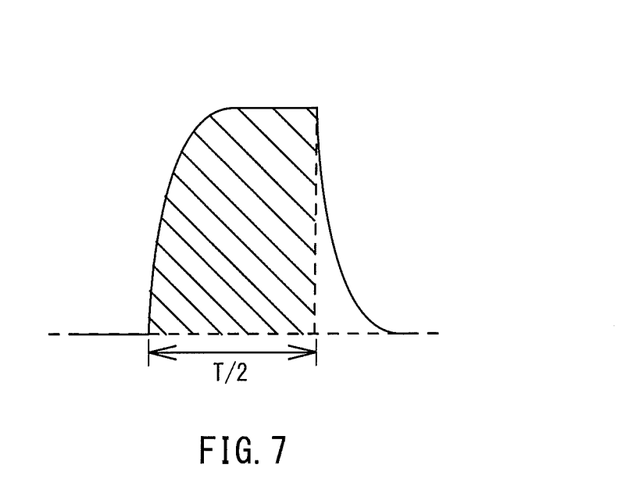
FIG. 7 is a graph illustrating the effective value of a voltage.

The effective value of a voltage may be represented by the area of the hatched portion in FIG. 7. The effective value of a voltage may be defined by the following equation (3):

[Expression 1]

$$\int_0^{\frac{T}{2}} V(t)\,dt \quad (3)$$

V(t) represents the magnitude of the drive voltage for time t. T denotes the cycle of the drive voltage wave.

For the effective value of a voltage to be 3 volts or more, the following equation (4) must be satisfied:

[Expression 2]

$$\int_0^{\frac{T}{2}} V(t)\,dt \geq 1.5\,T \quad (4)$$

Figure 8:
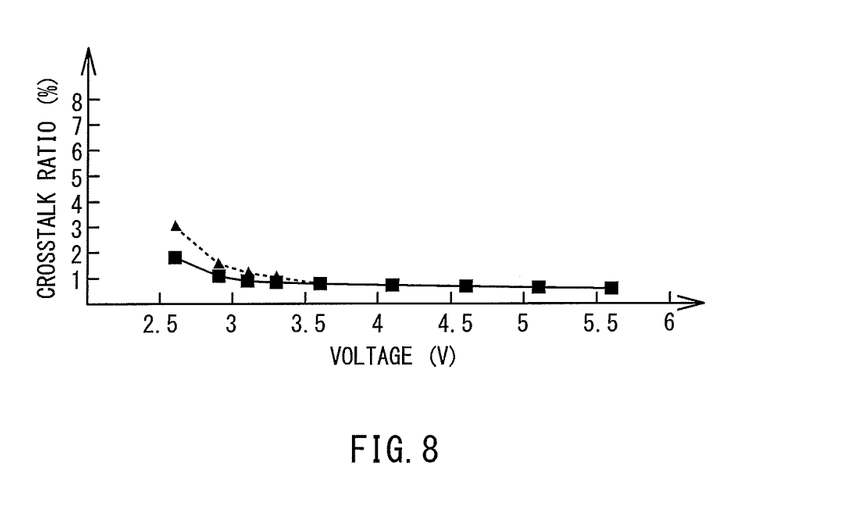
FIG. 8 is a graph showing experiment data that indicates that the crosstalk ratio is not more than 5% if the effective value of a voltage is 3 volts or more.
Figure 9:
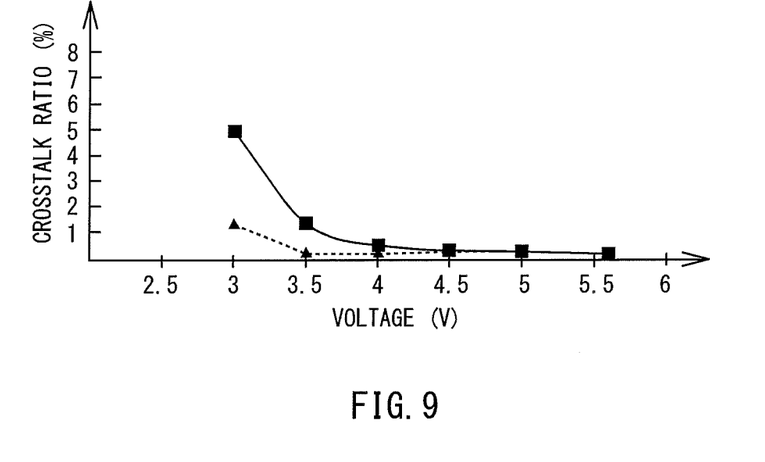
FIG. 9 is a graph showing other experiment data that indicates that the crosstalk ratio is not more than 5% if the effective value of a voltage is 3 volts or more.
Figure 10:
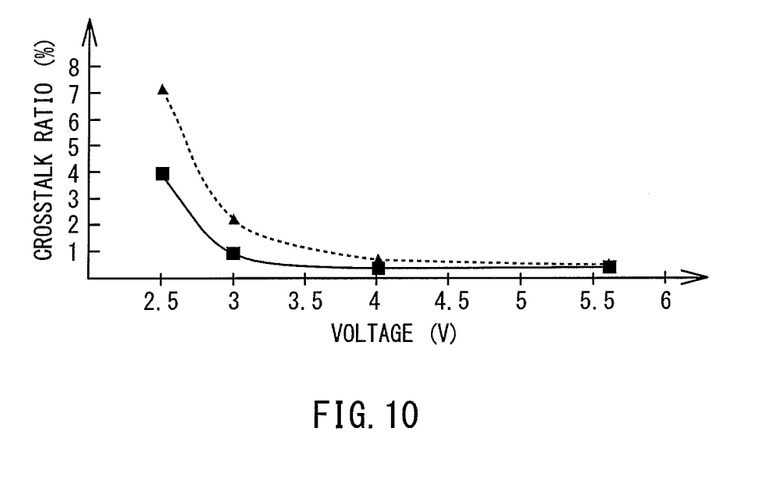
FIG. 10 is a graph showing still other experiment data that indicates that the crosstalk ratio is not more than 5% if the effective value of a voltage is 3 volts or more.

If the effective value of a voltage is 3 volts or more, the crosstalk ratio is 5% or smaller, as shown in FIGS. 8 to 10. Generally, if the crosstalk ratio is 5% or smaller, good 3D display can be achieved.

FIGS. 8 and 10 are graphs showing data from experiments conducted on a switch liquid crystal panel 14 having such liquid crystal as described below. In these experiments, the operating mode of the liquid crystal was the TN, normally white mode. The retardation of the liquid crystal was the value corresponding to the first maximum in a graph illustrating light transmission versus retardation in normally white mode.

FIG. 9 is a graph showing data from experiments conducted on a switch liquid crystal panel 14 having such liquid crystal as described below. In these experiments, the operating mode of the liquid crystal was the TN, normally white mode. The retardation of the liquid crystal was the value corresponding to the second maximum in a graph illustrating light transmission versus retardation in normally white mode.

In FIGS. 8 to 10, broken lines represent the crosstalk ratio for the right eye point, while solid lines represent the crosstalk ratio for the left eye point.

As shown in FIGS. 8 to 10, the crosstalk ratio is 5% or less if the effective value of a voltage is 3 volts or more in any of these implementations.

Application Example of First Embodiment

Figure 11:
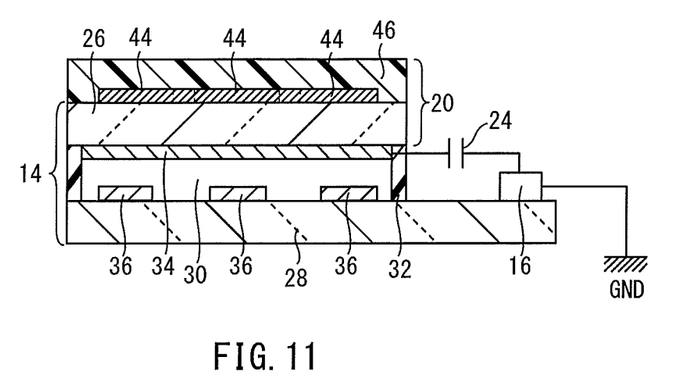
FIG. 11 is a schematic cross-sectional view of an exemplary switch liquid crystal panel included in a stereoscopic display device according to an application example of the first embodiment.

The above one terminal of the capacitor 24 need not be connected with a line for applying a voltage between the common electrode 34 and driving electrodes 36. For example, the one shown in FIG. 11, the one terminal of the capacitor 24 may be connected with the common electrode 34.

Second Embodiment

Figure 12:
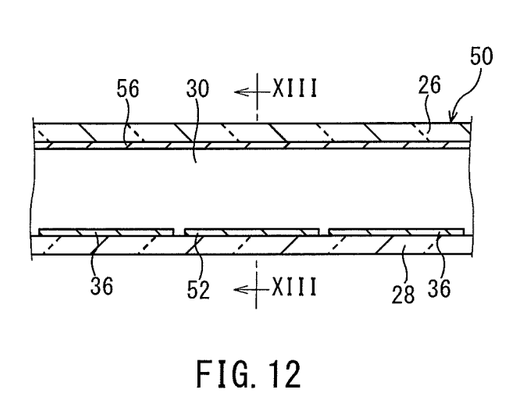
FIG. 12 is a schematic cross-sectional view of an exemplary switch liquid crystal panel included in a stereoscopic display device according to a second embodiment of the present invention, showing the cross-section along XII-XII of FIG. 13.
Figure 13:
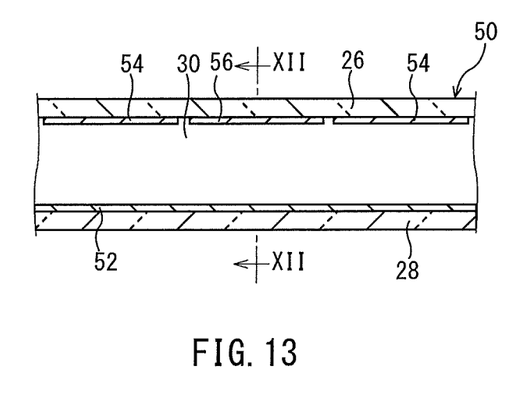
FIG. 13 shows the cross-section along XIII-XIII of FIG. 12.

The present embodiment has a different switch liquid crystal panel from that of the first embodiment. As shown in FIGS. 12 and 13, in the switch liquid crystal panel 50 of the present embodiment, auxiliary electrodes (first auxiliary electrodes) 52 are provided on the substrate 28. The auxiliary electrodes 52 extend in a vertical direction of the switch liquid crystal panel 50 with a predetermined width. Each of the auxiliary electrodes 52 is located between two adjacent driving electrodes (first driving electrodes) 36. That is, the driving electrodes 36 and auxiliary electrodes 52 are arranged alternately. The auxiliary electrodes 52 may be from any transparent conductive film. For example, the auxiliary electrodes 52 may be from an indium tin oxide film.

In the switch liquid crystal panel 50 of the present embodiment, the common electrode 34 is not provided on the substrate 26. Instead, driving electrodes (second driving electrodes) 54 and auxiliary electrodes (second auxiliary electrodes) 56 are arranged alternately. These electrodes 54 and 56 are arranged in a direction perpendicular to the direction in which the electrodes 36 and 52 on the substrate 28 are arranged. The driving electrodes 54 and auxiliary electrodes 56 extend in a horizontal direction of the switch liquid crystal panel 50 with a generally constant width. The driving electrodes 54 and auxiliary electrodes 56 may be from any transparent conductive film. For example, the driving electrodes 54 and auxiliary electrodes 56 may be from an indium tin oxide film.

The switch liquid crystal panel 50 forms a parallax barrier in the following manner.

Figure 14:
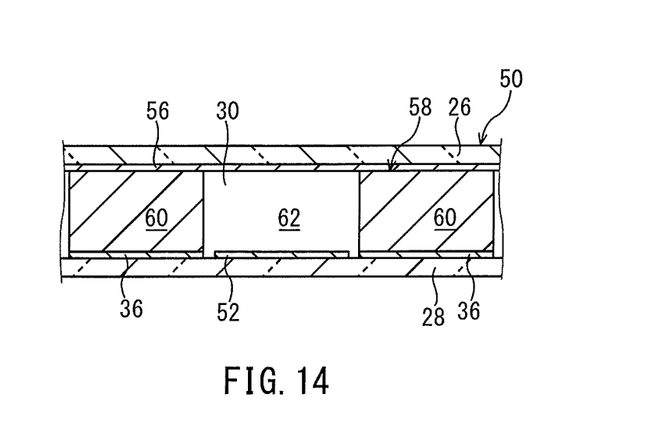
FIG. 14 is a cross-sectional view of the panel where one of the two parallax barriers that may be formed in the switch liquid crystal panel employed in the second embodiment is formed.

A parallax barrier 58 will be described with reference to FIG. 14. The parallax barrier 58 may be formed by causing the auxiliary electrodes 52, driving electrodes 54 (see FIG. 13) and auxiliary electrodes 56 to be at the same potential (0 volts, for example) and causing the driving electrodes 36 to be at a potential different from that of the electrodes 52, 54 and 56 (5 volts, for example). This changes the orientation of liquid crystal molecules located between the driving electrodes 36 and the driving electrodes 54 and auxiliary electrodes 56 that serve as a common electrode. Thus, those portions of the liquid crystal that overlie the driving electrodes 36 as viewed looking at the front side of the switch liquid crystal panel 50 function as light-shielding portions 60, while the portions between the light-shielding portions 60 function as transparent portions 62. As a result, the parallax barrier 58 including light-shielding portions 60 and transparent portions 62 arranged alternately is formed in the switch liquid crystal panel 50.

To form the parallax barrier 58, voltages may be applied to the electrodes 36, 52, 54 and 56 where the voltage applied to the driving electrodes 36 and the voltage applied to the other electrodes 52, 54 and 56 are in opposite phases, for example, or where a voltage is applied to the driving electrodes 36 while the other electrodes 52, 54 and 56 are grounded.

In the present embodiment, a parallax barrier different from the parallax barrier 58 may be formed.

Figure 15:
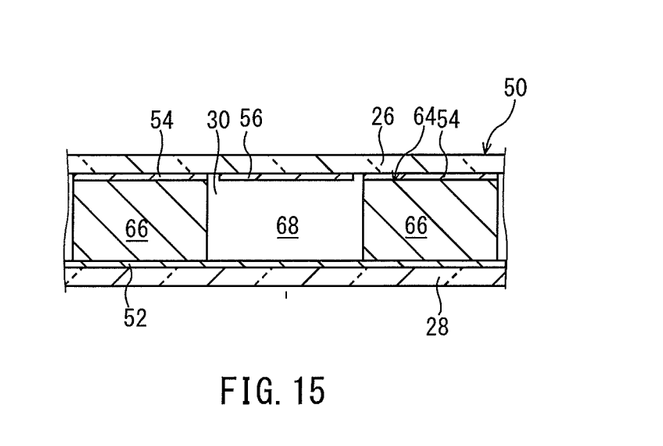
FIG. 15 is a cross-sectional view of the panel where the other one of the two parallax barriers that may be formed in the switch liquid crystal panel employed in the second embodiment is formed.

A parallax barrier 64 will be described with reference to FIG. 15. The parallax barrier 64 may be formed by causing the auxiliary electrodes 56, driving electrodes 36 (see FIG. 12) and auxiliary electrodes 52 to be at the same potential (0 volts, for example) and causing the driving electrodes 54 to be at a potential different from that of the electrodes 36, 52 and 56 (5 volts, for example). This changes the orientation of liquid crystal molecules located between the driving electrodes 54 and the driving electrodes 36 and auxiliary electrodes 52 that serve as a common electrode. Thus, those portions of the liquid crystal that overlie the driving electrodes 54 as viewed looking at the front side of the switch liquid crystal panel 50 function as light-shielding portions 66, while the portions between the light-shielding portions 66 function as transparent portions 68. As a result, the parallax barrier 64 including light-shielding portions 66 and transparent portions 68 arranged alternately is formed in the switch liquid crystal panel 50.

The light-shielding portions 66 and transparent portions 68 of the parallax barrier 64 are arranged alternately in a direction that is perpendicular to the direction in which the light-shielding portions 60 and transparent portions 62 of the parallax barrier 58 are arranged alternately.

To form the parallax barrier 64, voltages may be applied to the electrodes 36, 52, 54 and 56 where the voltage applied to the driving electrodes 54 and the voltage applied to the other electrodes 36, 52 and 56 are in opposite phases, for example, or where a voltage is applied to the driving electrodes 54 while the other electrodes 36, 52 and 56 are grounded.

In the present embodiment, two parallax barriers 58 and 64 may be formed. The light-shielding portions 66 and transparent portions 68 of the parallax barrier 64 are arranged alternately in a direction that is perpendicular to the direction in which the light-shielding portions 60 and transparent portions 62 of the parallax barrier 58 are arranged alternately. Thus, in the present embodiment, a stereoscopic display device that supports landscape and portrait modes may be realized.

Figure 16:
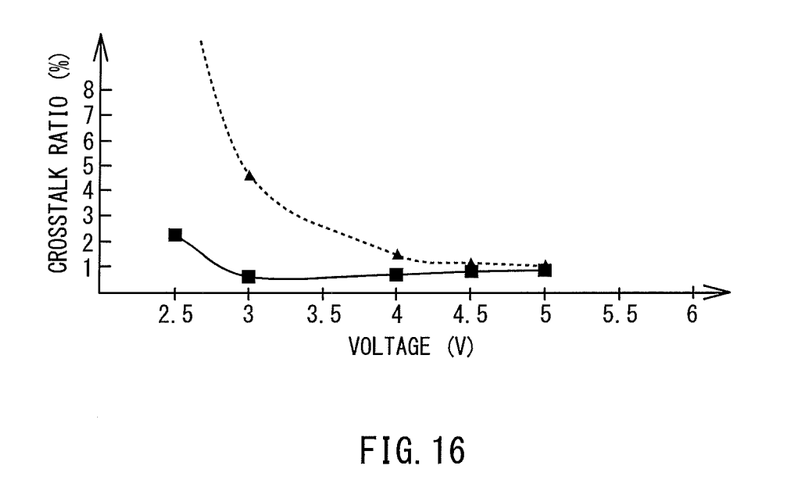
FIG. 16 is a graph showing experiment data from the second embodiment that indicates that the crosstalk ratio is not more than 5% if the effective value of a voltage is 3 volts or more.
Figure 17:
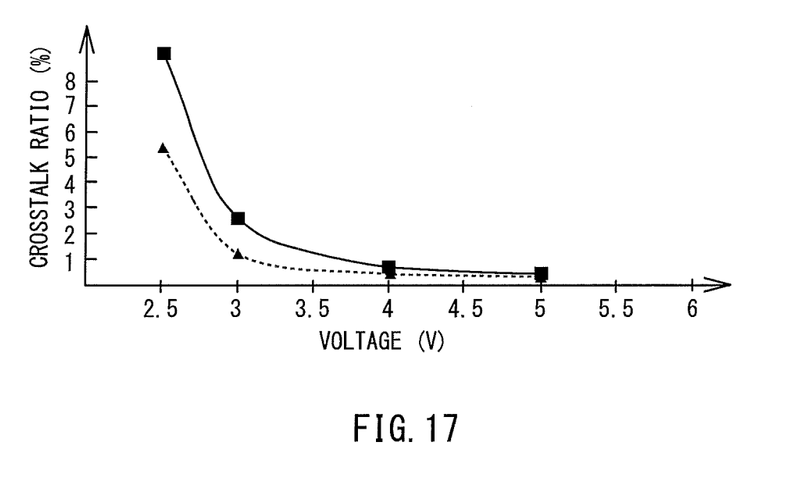
FIG. 17 is a graph showing other experiment data from the second embodiment that indicates that the crosstalk ratio is not more than 5% if the effective value of a voltage is 3 volts or more.

In the present embodiment, too, as shown in FIGS. 16 and 17, the crosstalk ratio is 5% or less if the effective value of a voltage is 3 volts or more.

FIGS. 16 and 17 are graphs showing data from experiments conducted on a switch liquid crystal panel 50 having such liquid crystal as described below. In these experiments, the operating mode of the liquid crystal was the TN, normally white mode. The retardation of the liquid crystal was the value corresponding to the first maximum in a graph illustrating light transmission versus retardation in normally white mode.

In FIGS. 16 and 17, broken lines represent the crosstalk ratio for the right eye point, while solid lines represent the crosstalk ratio for the left eye point.

In the present embodiment, too, the crosstalk ratio is 5% or less if the effective value of a voltage is 3 volts or more, as shown in FIGS. 16 and 17.

While embodiments of the present invention have been described in detail, they are merely illustrative examples and the present invention is not limited in any way to the above embodiments.

The invention claimed is:

1. A stereoscopic display device, comprising:
a display panel configured to display a composite image having stripe-shaped right eye sub-images and left eye sub-images arranged alternately;
a switch liquid crystal panel located on a front side of the display panel and capable of forming a parallax barrier having transparent portions for transmitting light and light-shielding portions for blocking light arranged alternately;
a touch panel located on a front side of the switch liquid crystal panel;
a driving circuit configured to drive the switch liquid crystal panel to form the parallax barrier; and
an RC circuit located between the switch liquid crystal panel and the driving circuit,
wherein the driving circuit drives the switch liquid crystal panel using a voltage with an effective value of 3 volts or more.

2. The stereoscopic display device according to claim 1, wherein:
the switch liquid crystal panel includes:
a pair of substrates;
a liquid crystal layer enclosed between the substrates;
a common electrode provided on one of the substrates; and
first driving electrodes provided on the other one of the substrates, and
the light-shielding portions are formed as the driving circuit applies to the first driving electrodes a voltage different from that applied to the common electrode.

3. The stereoscopic display device according to claim 2, further comprising:
first auxiliary electrodes provided on the other one of the substrates, the first driving electrodes and the first auxiliary electrodes being arranged alternately,
the common electrode includes:
second driving electrodes provided on the one of the substrates; and
second auxiliary electrodes provided on the one of the substrates, the second driving electrodes and the second auxiliary electrodes being arranged alternately,
the first driving electrodes are perpendicular to the second driving electrodes as viewed looking at the front side of the switch liquid crystal panel,
first light-shielding portions are formed as the driving circuit applies to the first driving electrodes a voltage different from that for the second driving electrodes and the second auxiliary electrodes, and
second light-shielding portions are formed that are perpendicular to the first light-shielding portions as the driving circuit applies to the second driving electrodes a voltage different from that for the first driving electrodes and the first auxiliary electrodes.

4. The stereoscopic display device according to claim 2, wherein:
the one of the substrates is located on the touch panel,
the common electrode overlies the entire liquid crystal layer as viewed looking at the front side of the switch liquid crystal panel,
the RC circuit includes a capacitor, and the capacitor has one terminal connected with the common electrode and the other terminal that is grounded.

5. The stereoscopic display device according to claim 1, wherein the RC circuit has a cutoff frequency that is equal to or smaller than a driving frequency for the touch panel.

6. The stereoscopic display device according to claim 5, wherein the cutoff frequency is 70% of the driving frequency or smaller.

7. The stereoscopic display device according to claim 2, wherein that one of the substrates which is located adjacent the touch panel serves as a base substrate of the touch panel.

* * * * *